United States Patent
Yu et al.

(10) Patent No.: US 10,609,594 B2
(45) Date of Patent: *Mar. 31, 2020

(54) WIRELESS COMMUNICATION METHOD AND DEVICE THAT CONDITIONALLY OPERATES BASED ON A LENGTH INDICATOR TYPE

(71) Applicant: MEDIATEK INC., Hsin-Chu (TW)

(72) Inventors: Yu-Ping Yu, Taoyuan (TW); Chia-Chun Hsu, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/971,263

(22) Filed: May 4, 2018

(65) Prior Publication Data
US 2018/0255478 A1 Sep. 6, 2018

Related U.S. Application Data

(63) Continuation of application No. 14/989,101, filed on Jan. 6, 2016, now Pat. No. 10,045,254.

(60) Provisional application No. 62/102,214, filed on Jan. 12, 2015.

(51) Int. Cl.
*H04W 28/06* (2009.01)

(52) U.S. Cl.
CPC ......... *H04W 28/06* (2013.01); *H04W 28/065* (2013.01)

(58) Field of Classification Search
CPC .................... H04W 28/06; H04W 28/065
See application file for complete search history.

(56) References Cited

U.S. PATENT DOCUMENTS

| | | | |
|---|---|---|---|
| 9,313,690 B2 | 4/2016 | Marinier et al. | |
| 10,045,254 B2* | 8/2018 | Yu | H04W 28/065 |
| 2006/0262811 A1 | 11/2006 | Jiang | |
| 2007/0060139 A1* | 3/2007 | Kim | H04L 1/1841 455/445 |
| 2010/0135212 A1* | 6/2010 | Ho | H04W 28/065 370/328 |
| 2012/0275399 A1* | 11/2012 | Liu | H04W 28/065 370/329 |
| 2013/0044698 A1* | 2/2013 | Susitaival | H04W 28/06 370/329 |
| 2013/0250973 A1* | 9/2013 | Agiwal | H04W 28/065 370/474 |

(Continued)

FOREIGN PATENT DOCUMENTS

| | | |
|---|---|---|
| CN | 101370165 | 2/2009 |
| CN | 101883389 | 11/2010 |
| CN | 102237948 | 11/2011 |

(Continued)

*Primary Examiner* — Walli Z Butt
(74) *Attorney, Agent, or Firm* — McClure, Qualey & Rodack, LLP

(57) ABSTRACT

A wireless communication method and device are provided. The wireless communication method includes the steps of determining, by a user equipment (UE), that a length of an radio link control (RLC) service data unit (SDU) or RLC SDU segment is greater than a threshold, determining, by the UE, a type of length indicator which is allocated by a network, and determining, by the UE, to force to map the RLC SDU or RLC SDU segment to the end of an RLC protocol data unit (PDU) if the type of the length indicator is a first type.

10 Claims, 11 Drawing Sheets

(56) References Cited

U.S. PATENT DOCUMENTS

2015/0256472 A1* 9/2015 Lee .................. H04L 47/196
370/471

FOREIGN PATENT DOCUMENTS

| CN | 102273256 A | 12/2011 |
|----|-------------|---------|
| JP | 5296709 A | 5/2010 |
| JP | 2010287935 | 12/2010 |
| KR | 20020014938 | 2/2002 |
| WO | WO 2008/041295 | 4/2008 |

* cited by examiner

WIRELESS COMMUNICATION METHOD AND DEVICE THAT CONDITIONALLY OPERATES BASED ON A LENGTH INDICATOR TYPE

CROSS REFERENCE TO RELATED APPLICATIONS

This Application is a Continuation of U.S. patent application Ser. No. 14/989,101, filed on Jan. 6, 2016, now U.S. Pat. No. 10,045,254, which claims priority of U.S. Provisional Patent Application No. 62/102,214, filed on Jan. 12, 2015, the entirety of which is incorporated by reference herein.

BACKGROUND OF THE INVENTION

Field of the Invention

The invention generally relates to a wireless communication technology, and more particularly, to a wireless communication method for determining whether to be restricted in the concatenation rule according to the type of the length indicator.

Description of the Related Art

Multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by the Third Generation Partnership Project (3GPP). It is designed to better support mobile broadband Internet access by improving spectral efficiency, lowering costs, improving services, making use of new spectrums, and integrating better with other open standards using OFDMA on downlinks (DL), and SC-FDMA on uplinks (UL) and multiple-input multiple-output (MIMO) antenna technology.

FIG. 1A is a block diagram of a conventional control plane protocol stack in a wireless communications device and a LTE network. The wireless communications device includes a radio resource control (RRC) layer, a packet data convergence protocol (PDCP) layer, a radio link control (RLC) layer, a medium access control (MAC) layer and a physical (PHY) layer. The network includes a RRC layer, a PDCP layer, an RLC layer, a MAC layer and a PHY layer. The layers shown in FIG. 1A may be divided into a first layer (Layer 1), a second layer (Layer 2), and a third layer (Layer 3) based on three lower layers of a well-known interconnection scheme, such as an Open System Interconnection (OSI) reference model. FIG. 1B is a block diagram of a conventional user plane protocol stack in a wireless communications device and a LTE network. The wireless communications device includes a packet data convergence protocol (PDCP) layer, a radio link control (RLC) layer, a medium access control (MAC) layer and a physical (PHY) layer. The network includes a PDCP layer, an RLC layer, a MAC layer and a PHY layer. The layers shown in FIG. 1B may be divided into a first layer (Layer 1), a second layer (Layer 2), and a third layer (Layer 3) based on three lower layers of a well-known interconnection scheme, such as an Open System Interconnection (OSI) reference model.

In the LTE standard, there are some standards for RLC Service Data Unit (SDU) and RLC Protocol Data Unit (PDU) in the RLC layer as below. As shown in FIG. 2, an RLC PDU comprise two parts, head and data field, wherein the head comprises a plurality of length indicators (LI) for in indicating different RLC SDUs or RLC SDU segments in data field. Each of the RLC SDUs or RLC SDU segments should be indicated by a length indicator in an RLC PDU, instead of the last RLC SDU or RLC SDU segment, i.e. the last RLC SDU or RLC SDU segment does not need the length indicator. The length indicator indicates the length of an RLC SDU or RLC SDU segment in an RLC PDU.

Before the LTE standard of release 11 (R11), the length of the length indicator was 11 bits (11-bit length indicator), and the length indicator can only present a length of up to 2047 bytes for an RLC SDU or RLC SDU segment. Therefore, an RLC SDU or RLC SDU segment should be mapped to the end of the data field of the RLC PDU if its length is greater than 2047 bytes. Taking FIGS. 3A-3B for example, if the length of the SDU #3 is smaller than or equal to 2047 bytes (as shown in FIG. 3A), the SDU #3 will not be mapped to the end of the data field of the RLC PDU, and the SDU #4 can be concatenated with the SDU #3. If the length of the SDU #3 is greater than 2047 bytes (as shown in FIG. 3B), the SDU #3 will be mapped to the end of the data field of the RLC PDU and the SDU #4 needs to be mapped to the next RLC PDU.

In the LTE standard of release 12 (R12), the 15-bit length indicator can be configured, it can represent a length of up to 32767 bytes (the max length of RLC SDU is 8188 bytes) for an RLC SDU or RLC SDU segment. However, in the current LTE standard, the concatenation rule is still restricted in the RLC layer. That is to say, even an UE supports 15-bit length indicator, an RLC SDU or RLC SDU segment still should be mapped to the end of the data field of the RLC PDU if its length is greater than 2047 bytes. Taking FIG. 3 for example, for 15-bit length indicator, if the length of the SDU #3 is greater than 2047 bytes, the SDU #3 will still be mapped to the end of the data field of the RLC PDU and the SDU #4 still needs to be mapped to the next RLC PDU.

BRIEF SUMMARY OF THE INVENTION

A wireless communication method and device are provided to overcome the problems mentioned above.

An embodiment of the invention provides a wireless communication method. The wireless communication method comprises the steps of determining whether the length of an RLC SDU or RLC SDU segment is greater than a threshold; determining a type of length indicator which is allocated by a network when the length of the RLC SDU or RLC SDU segment is greater than the threshold; and determining whether to force to map the RLC SDU or RLC SDU segment to the end of an RLC PDU according to the type of the length indicator. In some embodiments of the invention, the threshold is 2047 bytes.

In some embodiments of the invention, the wireless communication method further comprises the step of forcing to map the RLC SDU or RLC SDU segment to the end of the RLC PDU if the type of the length indicator is a first type. In some embodiments of the invention, the first type is 11-bit length indicator.

In some embodiments of the invention, the wireless communication method further comprises the step of not forcing to map the RLC SDU or RLC SDU segment to the end of the RLC PDU if the type of the length indicator is a second type. In some embodiments of the invention, the second type is 15-bit length indicator.

An embodiment of the invention provides a wireless communication method. The wireless communication method comprises the steps of determining a type of length indicator which is allocated by a network; and not forcing to map an RLC SDU or RLC SDU segment to the end of an RLC PDU if the type of the length indicator is a second type. In some embodiments of the invention, the wireless communication method further comprises the steps of determining whether a length of the RLC SDU or RLC SDU segment is greater than a threshold if the type of the length indicator is a first type; and determining whether to force to map the RLC SDU or RLC SDU segment to the end of the RLC PDU according to a determination result of the length of the RLC SDU or RLC SDU segment.

An embodiment of the invention provides a wireless communication device. The wireless communication device comprises a processor. The processor is configured to determine whether a length of an RLC SDU or RLC SDU segment is greater than a threshold, determine a type of length indicator which is allocated by a network when a length of the RLC SDU or RLC SDU segment is greater than a threshold and determine whether to force to map an RLC SDU or RLC SDU segment to the end of an RLC PDU according to the type of the length indicator.

An embodiment of the invention provides a wireless communication device. The wireless communication device comprises a processor. The processor is configured to determine a type of length indicator which is allocated by a network, and does not force to map an RLC SDU or RLC SDU segment to the end of an RLC PDU if the type of the length indicator is a second type. In some embodiments of the invention, the processor further determines whether a length of the RLC SDU or RLC SDU segment is greater than a threshold if the type of the length indicator is a first type, and determine whether to force to map the RLC SDU or RLC SDU segment to the end of the RLC PDU according to a determination result of the length of the RLC SDU or RLC SDU segment.

Other aspects and features of the invention will become apparent to those with ordinary skill in the art upon review of the following descriptions of specific embodiments of methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
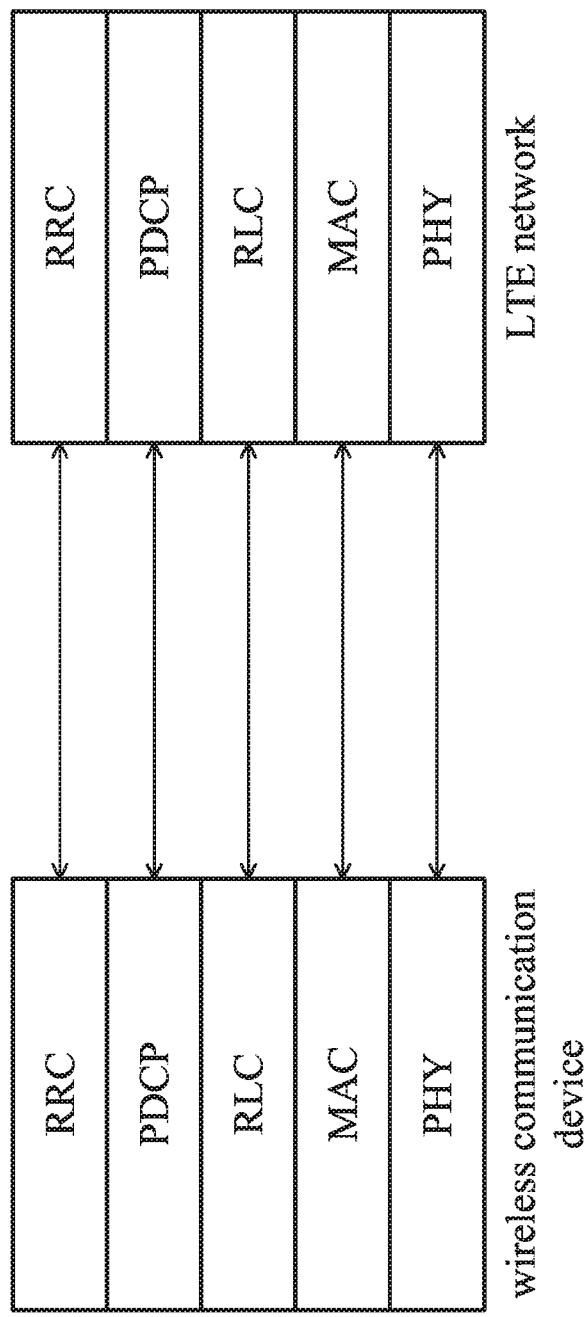
FIG. 1A is a block diagram of a conventional control plane protocol stack in a wireless communications device and a LTE network in prior art.
Figure 1B:
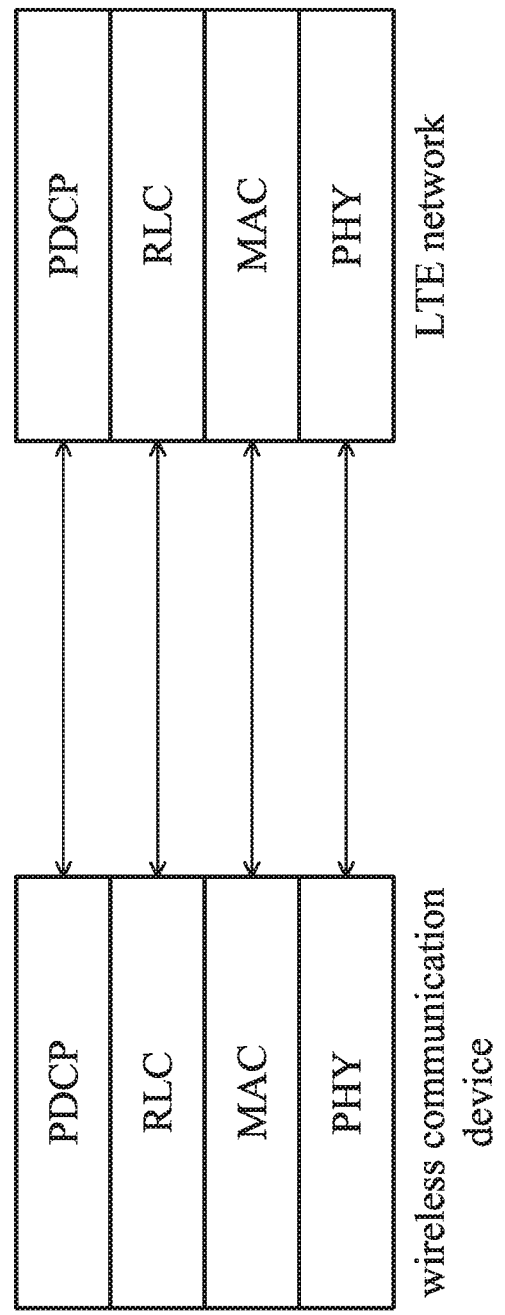
FIG. 1B is a block diagram of a conventional user plane protocol stack in a wireless communications device and a LTE network in prior art.
Figure 2:
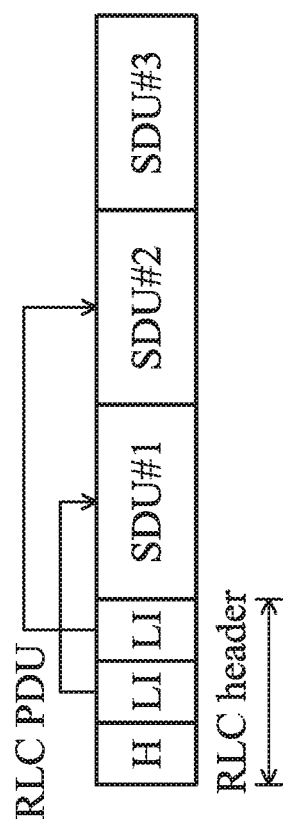
FIG. 2 is schematic diagrams illustrating an RLC PDU in prior art.
Figure 3A:
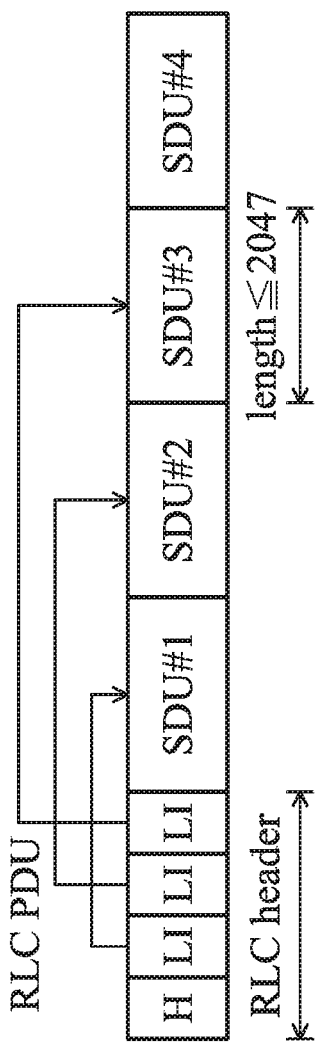
FIGS. 3A-3B are schematic diagrams illustrating an RLC PDU for 11-bit length indicator of the RLC SDU in the prior art.
Figure 3B:
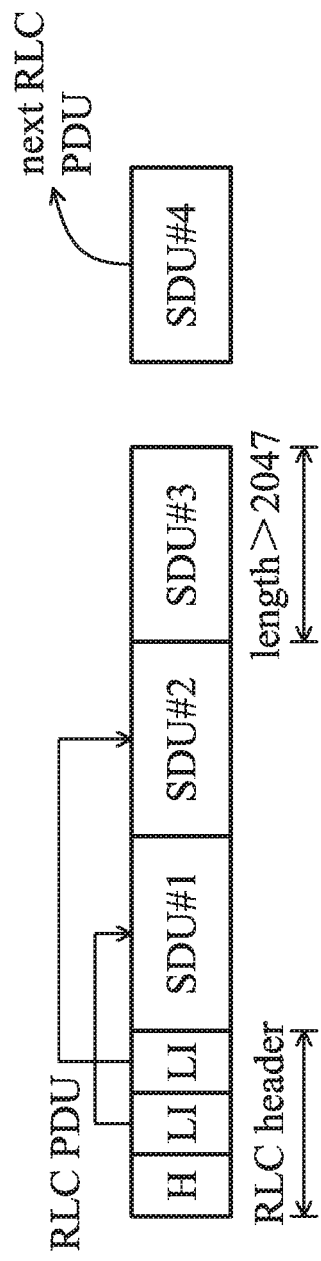
Figure 4:
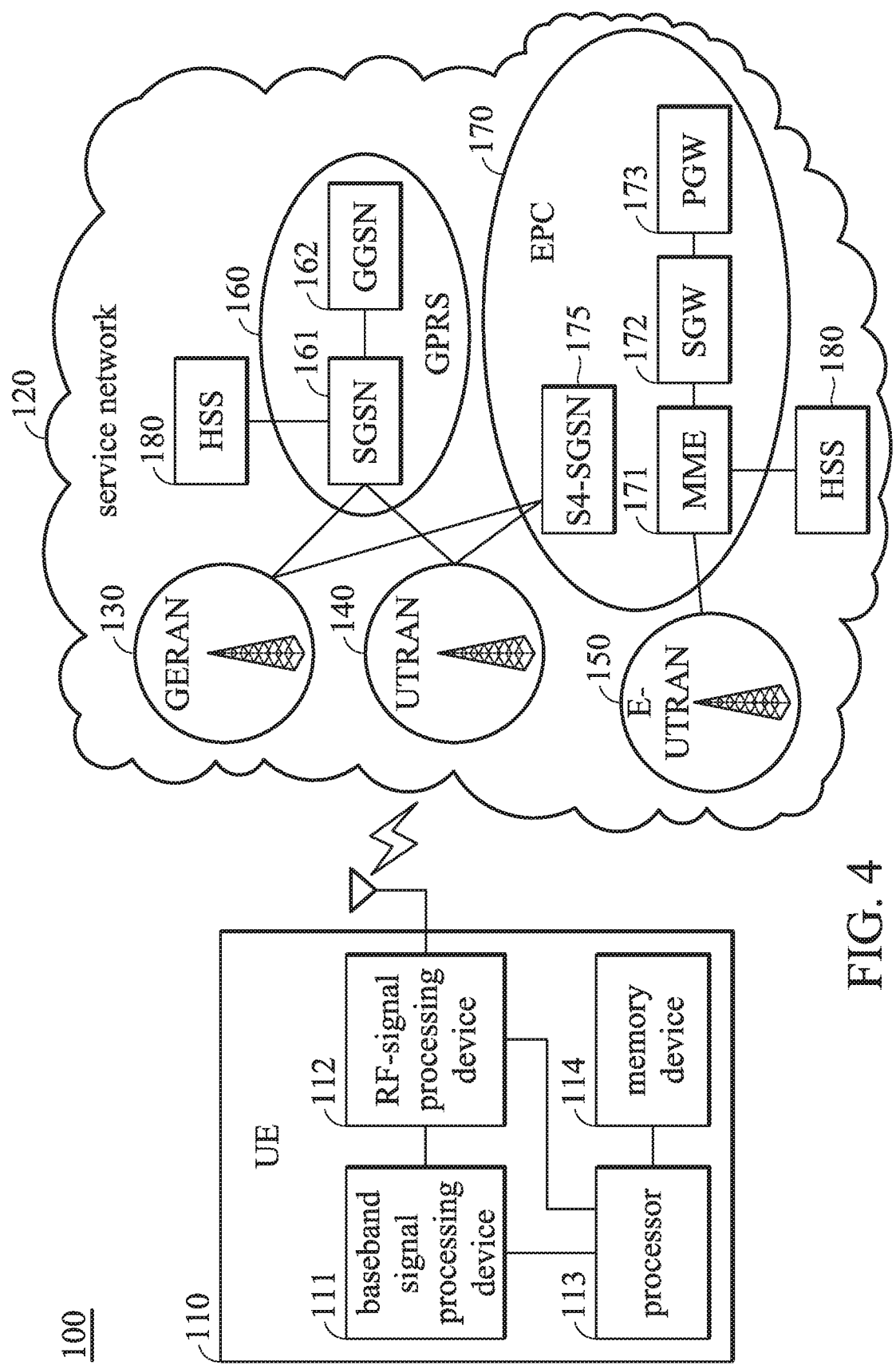
FIG. 4 is a block diagram of a mobile communications system 100 according to an embodiment of the invention.

FIG. 4 is a block diagram of a mobile communications system 100 according to an embodiment of the invention. The system 100 comprises User Equipment (UE) 110 and a service network 120. The UE 110 may be a mobile communications device, such as a cellular phone, a smartphone modem processor, a data card, a laptop stick, a mobile hotspot, a USB modem, a tablet, etc.

The UE 110 may comprise at least a baseband signal processing device 111, a radio frequency (RF) signal processing device 112, a processor 113, a memory device 114, and an antenna module comprising at least one antenna. Note that, in order to clarify the concept of the invention, FIG. 4 presents a simplified block diagram in which only the elements relevant to the invention are shown. However, the invention should not be limited to what is shown in FIG. 4. In an embodiment of the invention the UE 110 can support different types of the length indicators (LI), such 11-bit LI and 15-bit LI.

The RF signal processing device 112 may receive RF signals via the antenna and process the received RF signals to convert the received RF signals to baseband signals to be processed by the baseband signal processing device 111, or receive baseband signals from the baseband signal processing device 111 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, etc.

The baseband signal processing device 111 may further process the baseband signals to obtain information or data transmitted by the peer communications apparatus. The baseband signal processing device 111 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 113 may control the operations of the baseband signal processing device 111 and the RF signal processing device 112. According to an embodiment of the invention, the processor 113 may also be arranged to execute the program codes of the software module(s) of the corresponding baseband signal processing device 111 and/or the RF signal processing device 112. The program codes accompanied by specific data in a data structure may also be referred to as a processor logic unit or a stack instance when being executed. Therefore, the processor 113 may be regarded as being comprised of a plurality of processor logic units, each for executing one or more specific functions or tasks of the corresponding software module(s).

The memory device 114 may store the software and firmware program codes, system data, user data, etc. of the UE 110. The memory device 114 may be a volatile memory such as a Random Access Memory (RAM); a non-volatile memory such as a flash memory or Read-Only Memory (ROM); a hard disk; or any combination thereof.

According to an embodiment of the invention, the RF signal processing device 112 and the baseband signal processing device 111 may collectively be regarded as a radio module capable of communicating with a wireless network to provide wireless communications services in compliance with a predetermined Radio Access Technology (RAT). Note that, in some embodiments of the invention, the UE 110 may be extended further to comprise more than one antenna and/or more than one radio module, and the invention should not be limited to what is shown in FIG. 4.

In addition, in some embodiments of the invention, the processor 113 may be configured inside of the baseband signal processing device 111, or the UE 110 may comprise another processor configured inside of the baseband signal processing device 111. Thus the invention should not be limited to the architecture shown in FIG. 4.

The service network 120 may comprise a GSM EDGE Radio Access Network (GERAN) 130, a Universal Terrestrial Radio Access Network (UTRAN) 140, an Evolved UTRAN (E-UTRAN) 150, a General Packet Radio Service (GPRS) subsystem 160 and an Evolved Packet Core (EPC) subsystem 170. The GERAN 130, UTRAN 140 and E-UTRAN 150 may be in communication with the GPRS subsystem 160 or the EPC subsystem 170, wherein the GERAN 130, UTRAN 140 and E-UTRAN 150 allow connectivity between the UE 110 and the GPRS subsystem 160 or the EPC subsystem 170 by providing the functionality of wireless transmission and reception to and from the UE 110 for the GPRS subsystem 160 or the EPC subsystem 170, and the GPRS subsystem 160 or the EPC subsystem 170 signals the required operation to the GERAN 130, UTRAN 140 and E-UTRAN 150 for providing wireless services to the UE 110. The GERAN 130, UTRAN 140 and E-UTRAN 150 may contain one or more base stations (also called NodeBs or eNodeBs) and Radio Network Controllers (RNCs). Specifically, the GPRS subsystem 160 includes a Serving GPRS (General Packet Radio Services) Support Node (SGSN) 161 and a Gateway GPRS Support Node (GGSN) 162, wherein the SGSN 161 is the key control node for packet routing and transfer, mobility management (e.g., attach/detach and location management), session management, logical link management, and authentication and charging functions, etc., and the GGSN 162 is responsible for Packet Data Protocol (PDP) address assignments and interoperability with external networks. The EPC subsystem 170 may comprise a Mobility Management Entity (MME) 171, which may be responsible for idle mode UE tracking, paging procedures, and attachment and activation processes. The EPC subsystem 170 may also comprise a Servicing Gateway (SGW) 172, which may be responsible for the routing and forwarding of data packets. The EPC subsystem 170 may also include a Packet data network Gateway (PGW) 173, which may be responsible for providing connectivity from the UE 110 to external networks. Both the SGSN 161 and the MME 171 may be in communication with Home Subscriber Server (HSS) 180 which may provide device identification information, an International Mobile Subscriber Identity (IMSI), etc. It should be appreciated that the EPC subsystem 170 may also comprise a S4-SGSN 175, thereby allowing the GERAN 130 or UTRAN 140 to be accessed when the GPRS subsystem 160 is replaced by the EPC subsystem 170. Additionally, the service network 120 may also include other functional entities, such as a Home Location Register (HLR) (not shown) which is a central database storing user-related and subscription-related information, and the invention is not limited thereto. In an embodiment of the invention, the service network 120 may also comprise a Code Division Multiple Access (CDMA) network.

In an embodiment of the invention, the processor 113 may receive an RLC SDU from upper layer (e.g. PDCP layer) in the RLC layer. In addition, the UE 110 can obtain the length information of the RLC SDU from the upper layer in advance. Besides, RLC SDU segments may be generated due to RLC SDU segmentation if the processor 113 cannot put whole RLC SDU into an RLC PDU (e.g. due to the grant is not enough). And, the UE 110 still maintains the length information of the rest RLC SDU segment after RLC SDU segmentation.

Then, the processor 113 may determine whether the length of the RLC SDU or RLC SDU segment is greater than a threshold according to the length information of the RLC SDU or RLC SDU segment. When the length of the RLC SDU or RLC SDU segment is not greater than the threshold, the RLC SDU or RLC SDU segment is not forced to map to the end of an RLC PDU, i.e. it can be concatenated with the next RLC SDU or RLC SDU segment in the same RLC PDU.

When the length of the RLC SDU or RLC SDU segment is greater than the threshold, the processor 113 may determine a type (e.g. 11-bit LI or 15-bit LI) of the length indicator which is allocated by the network 120. Then, the processor 113 will determine whether to force to map the RLC SDU or RLC SDU segment to the end of an RLC PDU according to the type of the length indicator allocated by the network 120. In an embodiment of the invention, the threshold is set to 2047 bytes. In another embodiment of the invention, the processor 113 may determine the type of the length indicator which is allocated by the network 120 before determining whether the length of the RLC SDU or RLC SDU segment is greater than the threshold.

In an embodiment of the invention, if the type of a length indicator allocated by the network 120 is a first type (e.g. 11-bit length indicator), the processor 113 will force to map the RLC SDU or RLC SDU segment to the end of the RLC PDU. That is to say, if there is still another RLC SDU or RLC SDU segment later than the RLC SDU or RLC SDU segment, this RLC SDU or RLC SDU segment will be mapped to the next RLC PDU.

If the type of a length indicator allocated by the network 120 is a second type (e.g. 15-bit length indicator), the processor 113 will not force to map the RLC SDU or RLC SDU segment to the end of the RLC PDU. That is to say, if there is still another RLC SDU or RLC SDU segment later than the RLC SDU or RLC SDU segment, this RLC SDU or RLC SDU segment can be concatenated with the RLC SDU or RLC SDU segment in the same RLC PDU.

In an embodiment of the invention, the processor 113 may determine whether the length of the RLC SDU or RLC SDU segment is greater than a first threshold and is not great than a second threshold. When the length of the RLC SDU or RLC SDU segment is not greater than the first threshold, the RLC SDU or RLC SDU segment will not be forced to map to the end of an RLC PDU, i.e., it can be concatenated with the next RLC SDU or RLC SDU segment in the same RLC PDU. If the type of the length indicator allocated by the network 120 is the first type (e.g. 11-bit length indicator) and the length of the RLC SDU or RLC SDU segment is between the first threshold and the second threshold, the processor 113 will force to map the RLC SDU or RLC SDU segment to the end of the RLC PDU. If the type of the length indicator allocated by the network 120 is the second type (e.g. 15-bit length indicator) and the length of the RLC SDU or RLC SDU segment is between the first threshold and the second threshold, the processor 113 will not force to map the RLC SDU or RLC SDU segment to the end of the RLC PDU. When the length of the RLC SDU or RLC SDU segment is greater than the second threshold, the RLC SDU or RLC SDU segment will be forced to map to the end of the RLC PDU. In an embodiment of the invention, the first threshold is set to 2047 bytes and the second threshold is set to 32767 bytes. In another embodiment of the invention, the processor 113 may determine the type of the length indicator which is allocated by the network 120 before determining whether the length of the RLC SDU or RLC SDU segment is greater than the first threshold and is not great than a second threshold.

Figure 5A:
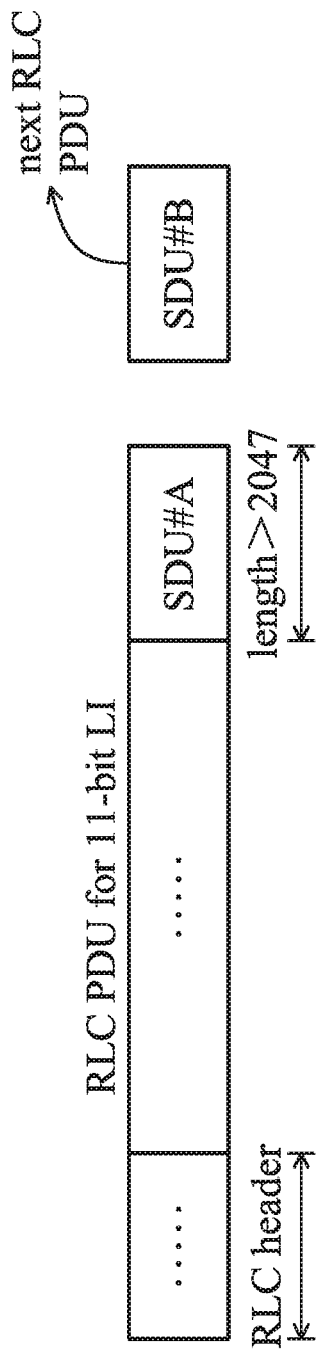
FIG. 5A is schematic diagrams illustrating an RLC PDU for 11-bit length indicator of the RLC SDU according to an embodiment of the invention.
Figure 5B:
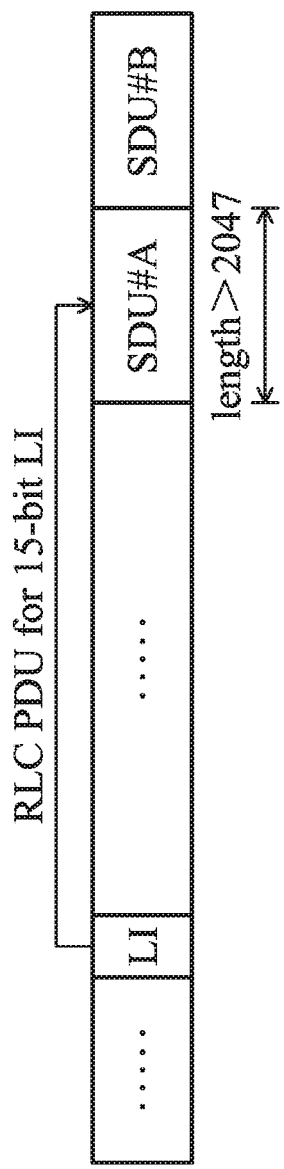
FIG. 5B is schematic diagrams illustrating an RLC PDU for 15-bit length indicator of the RLC SDU according to another embodiment of the invention.

FIGS. 5A-5B are schematic diagrams illustrating an RLC PDU for different types of length indicator according to an embodiment of the invention. As shown in FIGS. 5A-5B, a length of the RLC SDU # A is greater than a threshold (e.g. 2047 bytes). When the network 120 allocates 11-bit length indicator in RLC layer, the RLC SDU # A will be forced to map to the end of the RLC PDU and the RLC SDU # B will be mapped to the next RLC PDU (as shown in FIG. 5A). When the network 120 allocates 15-bit length indicator in RLC layer, the RLC SDU # A will not be forced to map to the end of the RLC PDU and the RLC SDU # B can be concatenated with the RLC SDU # A in the same RLC PDU (as shown in FIG. 5B). Note that, in order to clarify the concept of the invention, FIGS. 5A-5B presents a simplified schematic diagram only for illustrating the embodiments of the invention. However, the invention should not be limited to what is shown in FIGS. 5A-5B.

Figure 6:
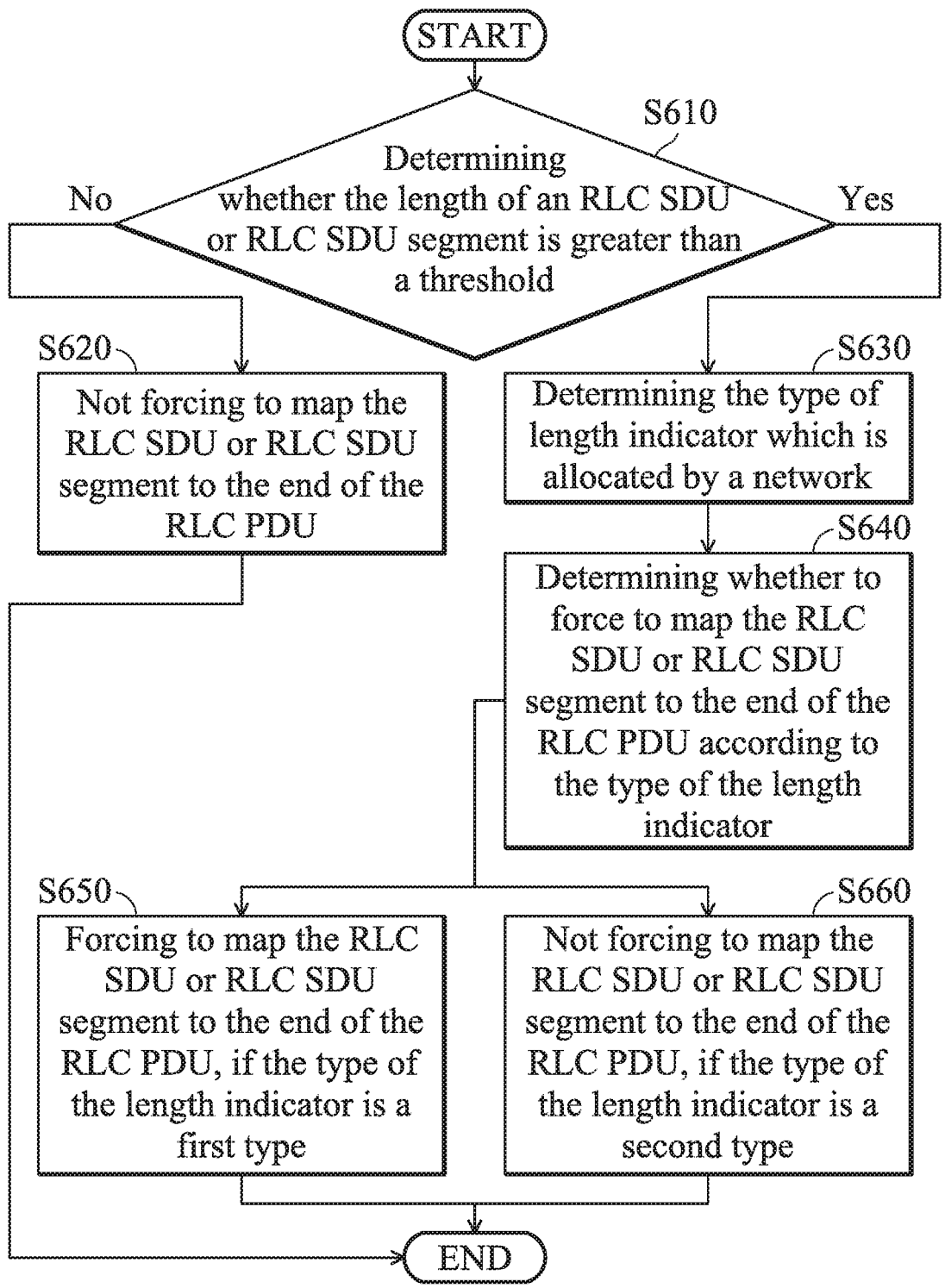
FIG. 6 is a flow chart illustrating the wireless communication method according to an embodiment of the invention.

FIG. 6 is a flow chart illustrating the wireless communication method according to an embodiment of the invention. The wireless communication method is applied to the UE 110. First, in step S610, the UE 110 determines whether the length of an RLC SDU or RLC SDU segment is greater than a threshold (e.g. 2047 bytes). When the length of the RLC SDU or RLC SDU segment is not greater than the threshold, step S620 will be performed. In step S620, the UE 110 will not force to map the RLC SDU or RLC SDU segment to the end of the RLC PDU.

When the length of the RLC SDU or RLC SDU segment is greater than the threshold, step S630 will be performed. In step S630, the UE 110 determines the type of length indicator which is allocated by a network 120. In step S640, the UE 110 determines whether to force to map the RLC SDU or RLC SDU segment to the end of the RLC PDU according to the type of the length indicator.

If the type of the length indicator is a first type (e.g. 11-bit length indicator), step S650 will be performed. In step S650, the UE 110 forces to map the RLC SDU or RLC SDU segment to the end of the RLC PDU. If the type of the length indicator is a second type (e.g. 15-bit length indicator), step S660 will be performed. In step S660, the UE 110 will not force to map the RLC SDU or RLC SDU segment to the end of the RLC PDU.

Figure 7:
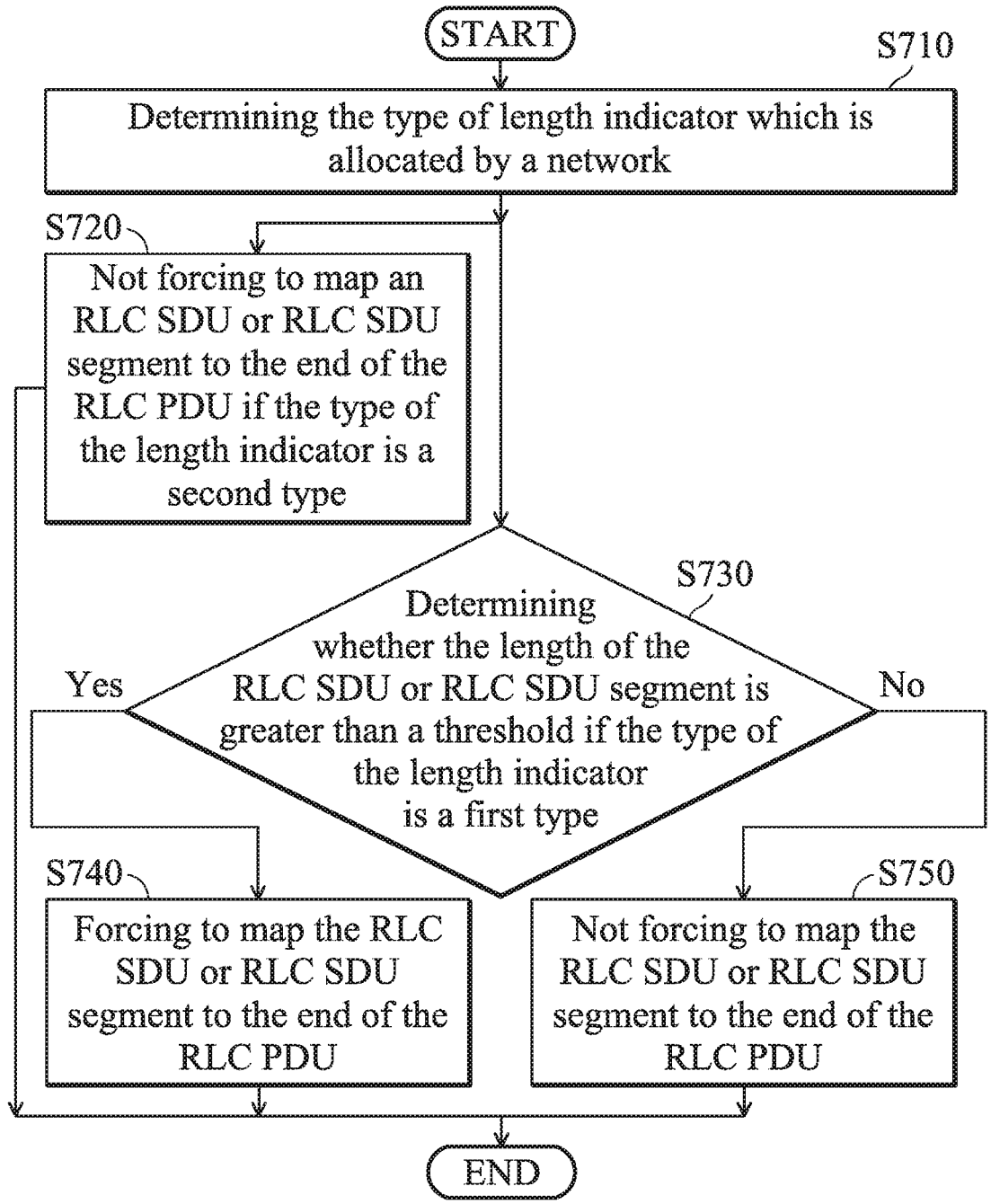
FIG. 7 is a flow chart illustrating the wireless communication method according to another embodiment of the invention.

FIG. 7 is a flow chart illustrating the wireless communication method according to another embodiment of the invention. The wireless communication method is applied to the UE 110. First, in step S710, the UE 110 determines the type of length indicator which is allocated by a network 120. If the type of the length indicator is a second type (e.g. 15-bit length indicator), step S720 will be performed. In step S720, the UE 110 will not force to map an RLC SDU or RLC SDU segment to the end of the RLC PDU.

If the type of the length indicator is a first type (e.g. 11-bit length indicator), step S730 will be performed. In step S730, the UE 110 determines whether the length of the RLC SDU or RLC SDU segment is greater than a threshold (e.g. 2047 bytes). When the length of the RLC SDU or RLC SDU segment is greater than the threshold, step S740 will be performed. In step S740, the UE 110 will force to map the RLC SDU or RLC SDU segment to the end of the RLC PDU. When the length of the RLC SDU or RLC SDU segment is not greater than the threshold, step S750 will be performed. In step S750, the UE 110 will not force to map the RLC SDU or RLC SDU segment to the end of the RLC PDU.

Figure 8:
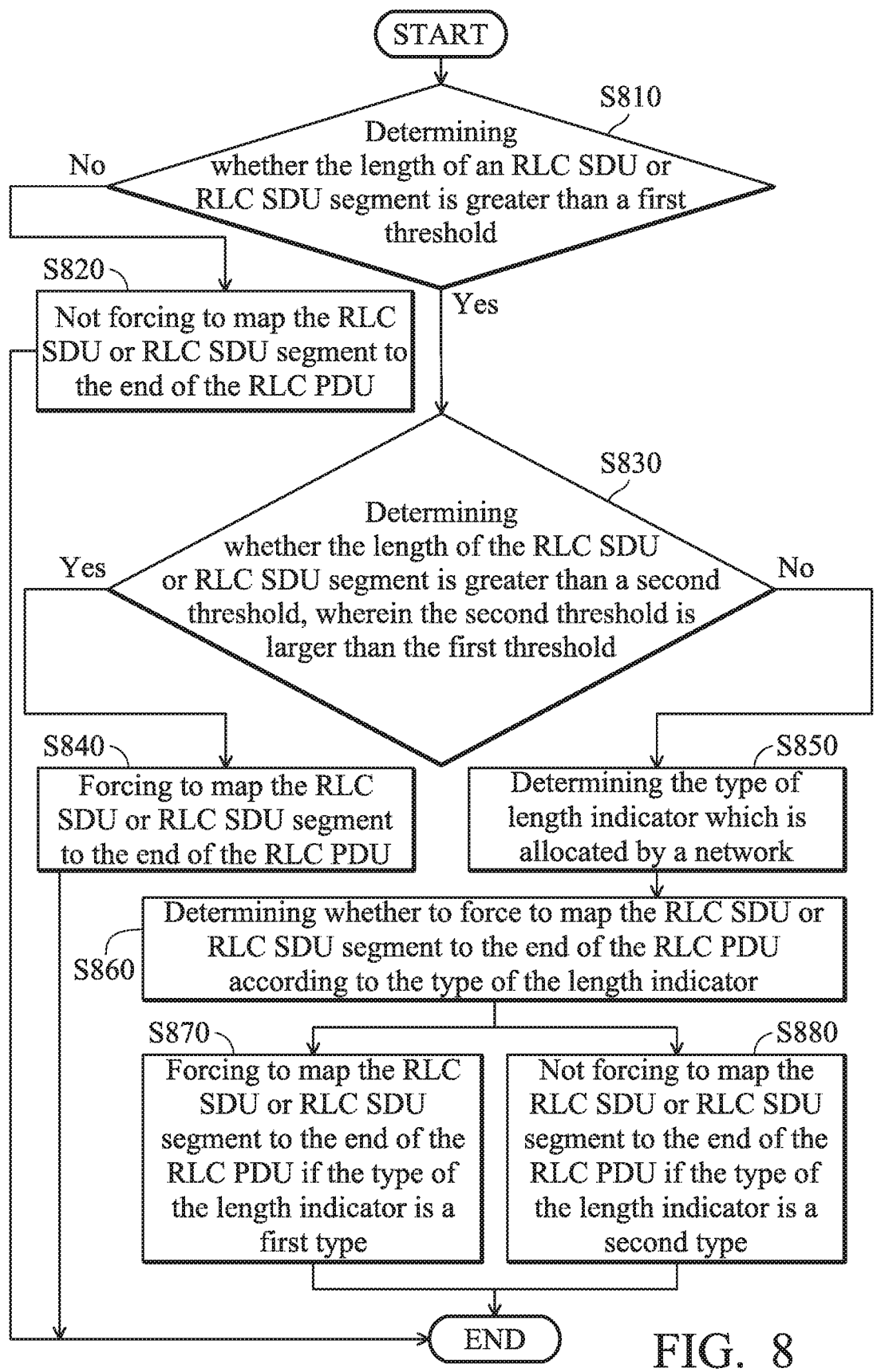
FIG. 8 is a flow chart illustrating the wireless communication method according to another embodiment of the invention.

FIG. 8 is a flow chart illustrating the wireless communication method according to another embodiment of the invention. The wireless communication method is applied to the UE 110. First, in step S810, the UE 110 determines whether the length of an RLC SDU or RLC SDU segment is greater than a first threshold (e.g. 2047 bytes). When the length of the RLC SDU or RLC SDU segment is not greater than the first threshold, step S820 will be performed. In step S820, the UE 110 will not force to map the RLC SDU or RLC SDU segment to the end of the RLC PDU.

When the length of the RLC SDU or RLC SDU segment is greater than the first threshold, step S830 will be performed. In step S830, determines whether the length of the RLC SDU or RLC SDU segment is greater than a second threshold (e.g. 32767 bytes), wherein the second threshold is larger than the first threshold. When the length of the RLC SDU or RLC SDU segment is greater than the second threshold, step S840 will be performed. In step S840, the UE 110 will force to map the RLC SDU or RLC SDU segment to the end of the RLC PDU.

When the length of the RLC SDU or RLC SDU segment is between the first threshold and the second threshold, step S850 will be performed. In step S850, the UE 110 determines the type of length indicator which is allocated by a network 120. In step S860, the UE 110 determines whether to force to map the RLC SDU or RLC SDU segment to the end of the RLC PDU according to the type of the length indicator.

If the type of the length indicator is a first type (e.g. 11-bit length indicator), step S870 will be performed. In step S870, the UE 110 forces to map the RLC SDU or RLC SDU segment to the end of the RLC PDU. If the type of the length indicator is a second type (e.g. 15-bit length indicator), step S880 will be performed. In step S880, the UE 110 will not force to map the RLC SDU or RLC SDU segment to the end of the RLC PDU.

Figure 9A:
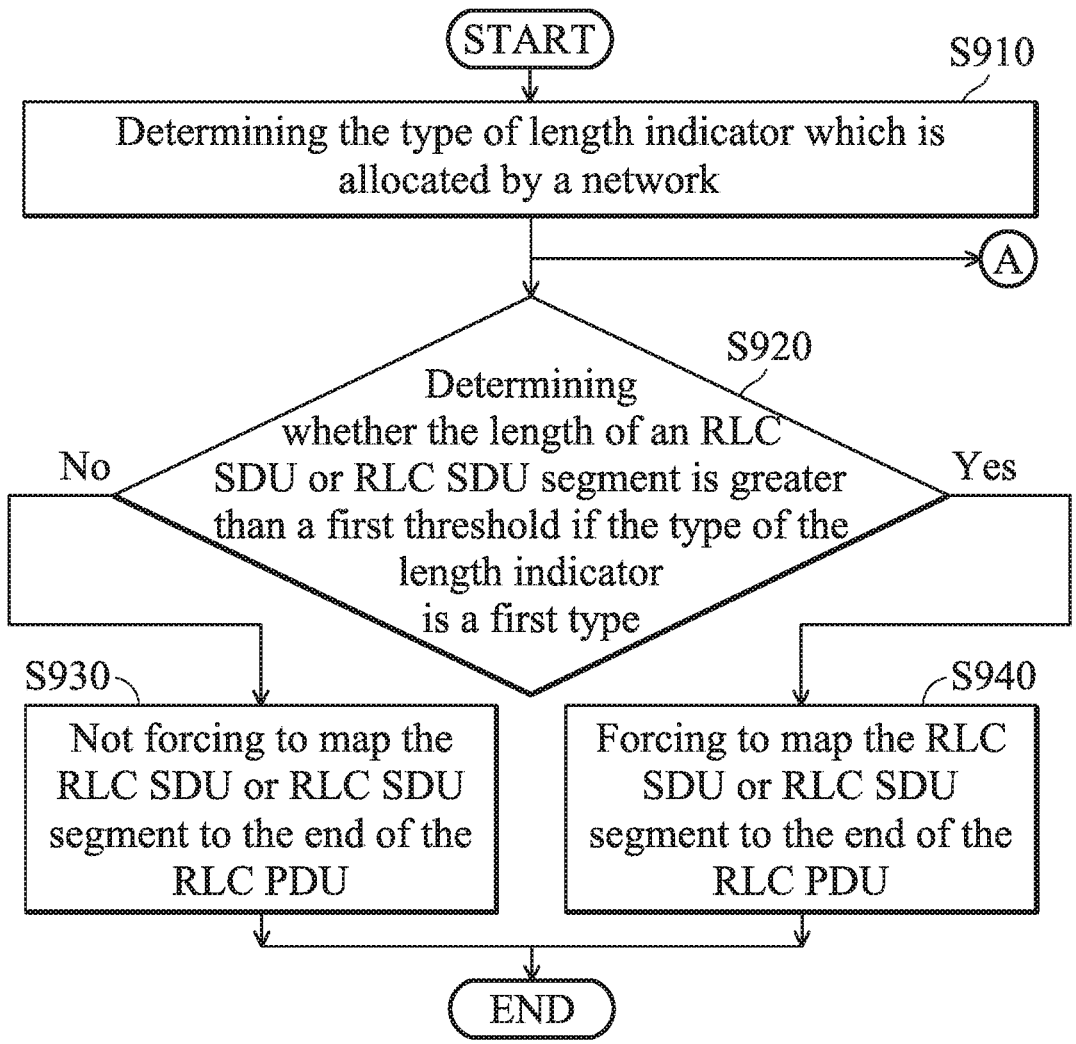
FIGS. 9A-9B is a flow chart illustrating the wireless communication method according to another embodiment of the invention.
Figure 9B:
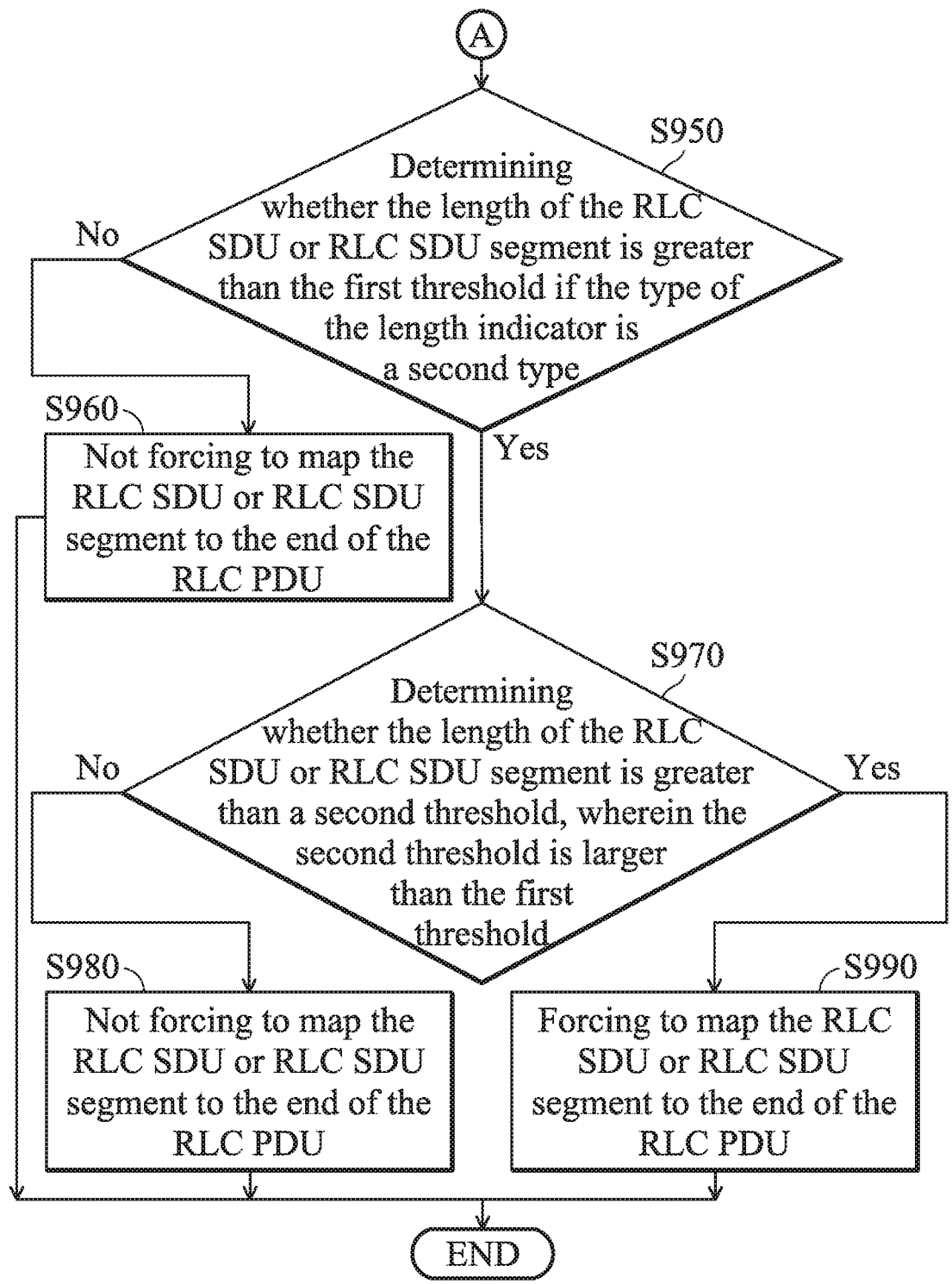

FIGS. 9A-9B is a flow chart illustrating the wireless communication method according to another embodiment of the invention. The wireless communication method is applied to the UE 110. First, in step S910, the UE 110 determines the type of length indicator which is allocated by a network 120. If the type of the length indicator is a first type (e.g. 11-bit length indicator), step S920 will be performed. In step S920, the UE 110 determines whether the length of an RLC SDU or RLC SDU segment is greater than a first threshold (e.g. 2047 bytes). When the length of the RLC SDU or RLC SDU segment is not greater than the first threshold, step S930 will be performed. In step S930, the UE 110 will not force to map the RLC SDU or RLC SDU segment to the end of the RLC PDU. When the length of the RLC SDU or RLC SDU segment is greater than the first threshold, step S940 will be performed. In step S940, the UE 110 will force to map the RLC SDU or RLC SDU segment to the end of the RLC PDU.

If the type of the length indicator is a second type (e.g. 15-bit length indicator), step S950 will be performed. In step S950, the UE 110 determines whether the length of the RLC SDU or RLC SDU segment is greater than the first threshold. When the length of the RLC SDU or RLC SDU segment is not greater than the first threshold, step S960 will be performed. In step S960, the UE 110 will not force to map the RLC SDU or RLC SDU segment to the end of the RLC PDU. When the length of the RLC SDU or RLC SDU segment is greater than the first threshold, step S970 will be performed. In step S970, the UE 110 determines whether the length of the RLC SDU or RLC SDU segment is greater than a second threshold (e.g. 32767 bytes), wherein the second threshold is larger than the first threshold. When the length of the RLC SDU or RLC SDU segment is not greater than the second threshold, step S980 will be performed. In step S980, the UE 110 will not force to map the RLC SDU or RLC SDU segment to the end of the RLC PDU. When the length of the RLC SDU or RLC SDU segment is greater than the second threshold, step S990 will be performed. In step S990, the UE 110 will force to map the RLC SDU or RLC SDU segment to the end of the RLC PDU.

In the wireless communication method, the UE can be flexibly operated in different types of the length indicators (e.g. 11-bit length indicator and 15-bit length indicator). For 15-bit length indicator, an RLC SDU or RLC SDU segment will not be forced to map to the end of the data field of the RLC PDU if its length is greater than 2047 bytes.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A wireless communication method, comprising:
   determining, by a user equipment (UE), that a length of an radio link control (RLC) service data unit (SDU) or RLC SDU segment is greater than a threshold;
   determining, by the UE, a type of length indicator which is allocated by a network; and
   determining, by the UE, to force to map the RLC SDU or RLC SDU segment to the end of an RLC protocol data unit (PDU) if the type of the length indicator is a first type,
   wherein the first type is 11-bit length indicator and a second type is 15-bit length indicator.

2. The wireless communication method of claim 1, further comprising:
   not forcing to map the RLC SDU or RLC SDU segment to the end of the RLC PDU if the type of the length indicator is the second type,
   wherein a first length of the first type of the length indicator is shorter than a second length of the second type of the length indicator.

3. The wireless communication method of claim 1, wherein the threshold is 2047 bytes.

4. A wireless communication method, comprising:
   determining, by a user equipment (UE), a type of length indicator which is allocated by a network;
   determining, by the UE, whether a length of a radio link control (RLC) service data unit (SDU) or RLC SDU segment is greater than a threshold if the type of the length indicator is a 11 bit length indicator; and
   forcing to map the RLC SDU or RLC SDU segment to the end of a RLC protocol data unit (PDU) when the length of the RLC SDU or RLC SDU segment is greater than the threshold.

5. The wireless communication method of claim 4, further comprising:

not forcing to map the RLC SDU or RLC SDU segment to the end of the RLC PDU when the length of the RLC SDU or RLC SDU segment is not greater than the threshold.

6. A wireless communication device, comprising:
a processor, configured to determine that a length of an radio link control (RLC) service data unit (SDU) or RLC SDU segment is greater than a threshold, determine a type of the length indicator which is allocated by a network and determine to force to map the RLC SDU or RLC SDU segment to the end of an RLC protocol data unit (PDU) if the type of the length indicator is a first type, wherein the first type is 11-bit length indicator and a second type is 15-bit length indicator.

7. The wireless communication device of claim 6, wherein the processor does not force to map the RLC SDU or RLC SDU segment to the end of the RLC PDU if the type of the length indicator is the second type, and wherein a first length of the first type of the length indicator is shorter than a second length of the second type of the length indicator.

8. The wireless communication device of claim 6, wherein the threshold is 2047 bytes.

9. A wireless communication device, comprising:
a processor, configured to determine a type of length indicator which is allocated by a network, determine whether a length of a radio link control (RLC) service data unit (SDU) or RLC SDU segment is greater than a threshold if the type of the length indicator is a 11-bit length indicator, and forces to map the RLC SDU or RLC SDU segment to the end of a RLC protocol data unit (PDU) when the length of the RLC SDU or RLC SDU segment is greater than the threshold.

10. The wireless communication device of claim 9, wherein the processor does not forcing to map the RLC SDU or RLC SDU segment to the end of the RLC PDU when the length of the RLC SDU or RLC SDU segment is not greater than the threshold.

* * * * *